Patented Jan. 30, 1951

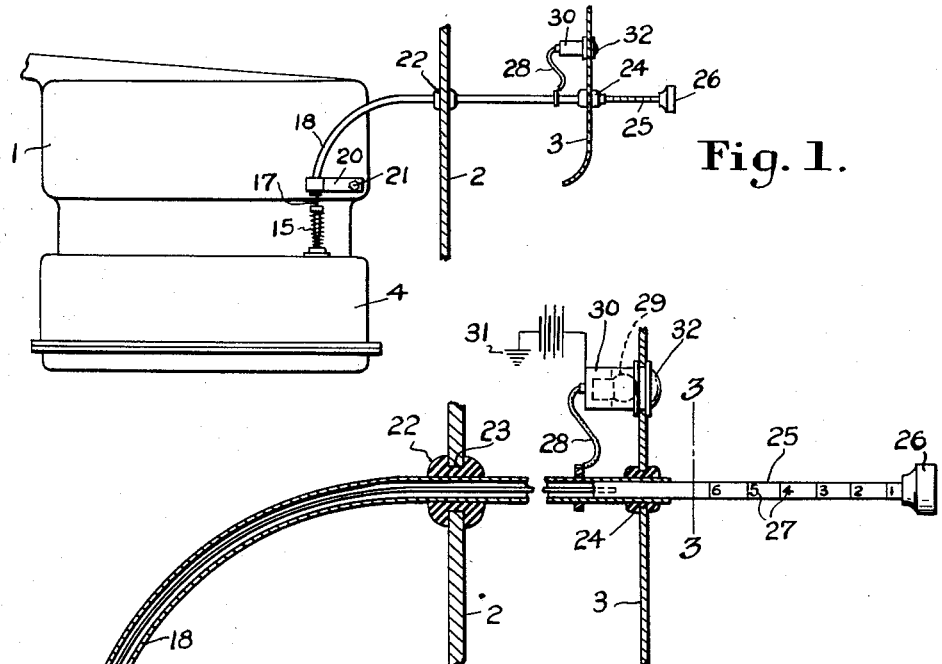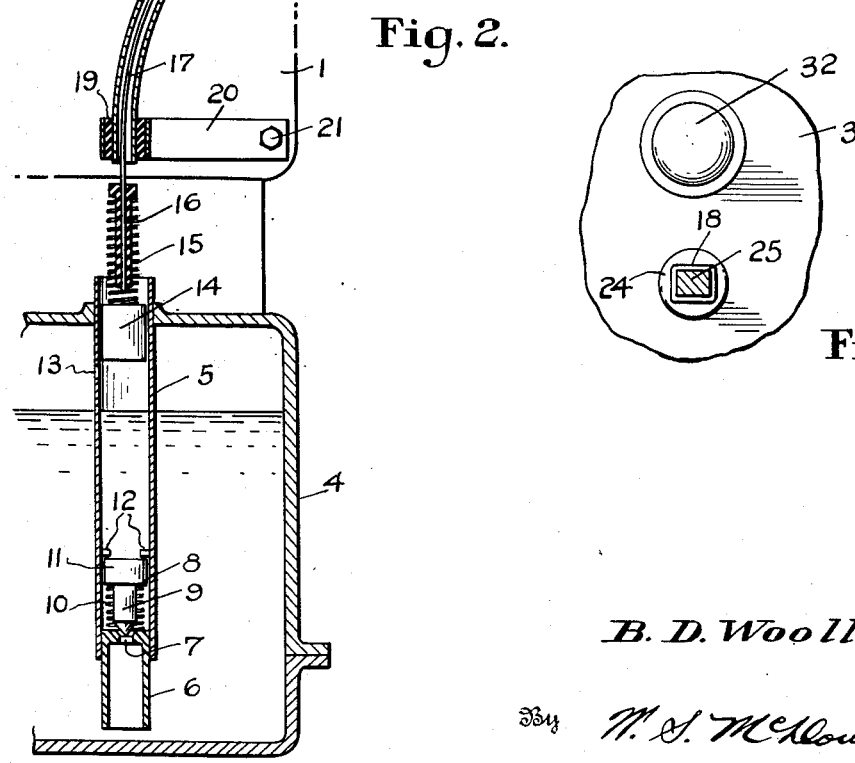

2,539,604

UNITED STATES PATENT OFFICE 2,539,604

OIL LEVEL INDICATOR FOR AUTOMOTIVE VEHICLES

Bruce D. Woolley, Johnstown, Ohio

Application November 20, 1947, Serial No. 787,194

3 Claims. (Cl. 73—290)

This invention relates to improvements in fluid level indicators, having particular reference to indicators for use in ascertaining the quantity of lubricating oil contained in the crank case of an automotive engine.

The usual automotive vehicle is provided on its instrument panel with an indicator for enabling the vehicle operator to determine the pressure on the lubricating oil being pumped to the various moving parts of an internal combustion engine. Such oil pressure indicators or gages, however, do not inform the vehicle operator as to the quantity of oil contained in the engine crank case, since normal pressures are indicated even though the actual amount of lubricating oil may be at a low level.

It is, therefore, an object of the present invention to provide a gage which may be read from the operator's position in an automobile to enable the operator to determine quickly and accurately the actual amount of lubricating oil contained in the engine crank case, and in a manner independent of oil-pumping pressures.

For a further understanding of the invention, reference is to be had to the following description and the accompanying drawing, wherein:

Fig. 1 is a side elevational view of an automotive engine with parts of the associated vehicle body disclosed in vertical cross section, and illustrating the application of my improved oil gage thereto;

Fig. 2 is a similar view on a larger scale, and disclosing in vertical cross section the construction of my improved gage or indicator;

Fig. 3 is a vertical transverse sectional view on the line 3—3 of Fig. 2.

Referring more particularly to the drawing, the numeral 1 designates an internal combustion engine of the type used in automobiles and other automotive vehicles. The numeral 2 indicates the dash or cowl panel of the body of such a vehicle and the numeral 3, the instrument panel thereof.

In accordance with the present invention, there is positioned in the crank case 4 of the engine a vertically depending tube 5. The lower end of the tube has formed therewith an extension 6 in which is provided a valve opening 7. Cooperative with this opening is a valve member 8 having a stem 9 which is pointed at its lower end for seating engagement with the opening 7, a spring 10 surrounding the stem of said valve and being positioned between the upper end of the extension 6 and the headed end 11 of the valve member. The spring serves to lift the valve member to its unseated position in which the upper end of the head 11 contacts with stop lugs 12 allowing oil contained in the crank case to pass through the opening 7 and around the valve member so that the level of the oil in the tube 5 will correspond with that of the crank case. The upper portion of the tube 5 is formed with an opening 13 for air circulation purposes. It will be understood that the valve member fits loosely in the tube 5 so that oil may pass freely between the outer surfaces of the head 11 and the inner wall surfaces of the tube 5.

Loosely mounted in the upper end of the tube 5 is a piston 14. The upper end of the piston is connected with a light coil spring 15 which surrounds a bushing 16 of dielectric composition, the upper end of the spring 15 being connected with the bushing. Passing through the bushing for rigid connection therewith and projecting slightly below the lower end thereof is a metallic wire 17. This wire extends through a curved tube 18, the lower end of said tube being secured to a sleeve 19 of insulating material which is carried by a bracket 20 attached as at 21 to the side of the engine 1. The upper horizontally extending portion of the tube passes through an insulating bushing 22 which is mounted in an opening 23 formed in the dash or cowl panel 2, and the extreme rear and upper end of the tube is received in a similar bushing 24 carried by the instrument panel 3. The upper and rear end of the wire 17 is connected with a horizontally slidable bar 25 which is positioned in the tube 18 and projects beyond the open upper end thereof, the outer end of the bar being equipped with a manipulating knob 26 and with a graduated scale 27.

Connected with the metallic tube 18 is a conductor 28 which extends to one terminal of an incandescent lamp bulb 29 mounted in a socket 30 carried by the instrument panel 3, the other terminal of the bulb being grounded as at 31. The front of the socket 30 may be formed with a lens 32 which is arranged in the view of the vehicle operator.

The piston 14 is loosely fitted in the upper end of the crank case tube 5, and the spring 15 is arranged above the same to prevent the lower end of the wire 17 from normally contacting the piston. When the knob or button 26 on the upper end of the wire is pushed inwardly, the spring 15 forces the piston downwardly within the tube 5 in a sufficiently positive manner to cause air contained within the tube to bypass or travel around the piston 14. However, as soon as the lower surface of the piston 14 contacts the oil at its level within the tube 5, the oil forms a seal which checks the descent of the piston and the pressure on the oil will immediately cause the valve member 8 to close the opening 7. By thus stopping the descent of the piston, the vehicle operator may refer to the position of the graduated scale on the bar 25 with reference to the end of the curved tube 18 at the instrument panel to determine visually the amount of oil present in the crank case.

To further notify the operator that the oil level has been contacted by the piston 14, I have provided the light bulb 29. Slight compression of the spring 15 causes the lower end of the wire 17, which protrudes below the bushing 16, to contact the piston, thus completing the circuit to the bulb by the grounding thereof to the engine and causing the bulb to be energized. It will be noted that all contacts of the wire 17 to the engine are insulated by the bushing 16, the sleeve 19 and the bushings 22 and 24.

The present invention thus provides a simple, economical and easily installed indicator system for enabling a vehicle operator to determine quickly and accurately the level or amount of oil present in the engine of an automotive vehicle. The device is independent of oil pressure as produced by the associated oil pump, not shown, of the engine. In the ordinary automotive vehicle, the only way now available for accurately ascertaining the oil level, is to lift the hood of the motor vehicle and remove the oil-gaging stick or bar which projects into the crank case. After the stick or bar has been removed, adhering oil is wiped therefrom and the stick again inserted into the engine crank case and withdrawn to permit of an oil level reading. Usually this operation is performed by service station attendants and, as a result, it is common for vehicle operators to neglect to take such oil level readings at sufficiently close intervals of time or vehicle operation to be informed as to oil level conditions. This constitutes a practical difficulty which results in car operation, quite frequently, with dangerously low oil levels in the engine. With the present invention, the vehicle operator is provided with such a convenient control that oil level readings may be taken at close intervals and the danger of operating without sufficient oil supply thereby minimized or precluded.

I claim:

1. Apparatus for indicating the level of liquid within a reservoir comprising a cylinder extending within the reservoir and normally communicating therewith to receive a level of liquid within the cylinder commensurate with the level of liquid within said reservoir, a piston member loosely and slidably carried within said cylinder above the level normally assumed by liquid contained in said reservoir, a compression spring attached at one end to said piston, cable means having one end connected with, but electrically insulated from, said spring and normally disposed in spaced relation to said piston and having at its opposite end an operating handle for moving said cable means, said spring and said piston to engage the latter with the top of a column of liquid received in said cylinder, said handle including a calibrated scale for indicating the extent of movement of said handle from a normal position, said spring serving, upon engagement of said piston with a column of liquid contained in said cylinder, to permit the said one end of said cable means to electrically engage said piston, and an electrical indicator circuit connected in series with said cable means and operable in response to engagement of said piston with a column of liquid in said cylinder and the consequent engagement of said cable means with said piston to indicate contact of said piston with liquid contained in said cylinder.

2. In apparatus for indicating the level of liquid within a liquid-containing reservoir, a vertically arranged cylinder extending within said reservoir and having a lower end provided with a check valve arranged to normally permit free communication between said cylinder and the reservoir and to permit liquid within said reservoir to enter said cylinder and assume a common level therein relative to the level of liquid within said reservoir, said check valve being operable in response to pressure applied to the top of a volume of liquid contained in said cylinder to close communication between said cylinder and said reservoir, a piston slidably mounted in said cylinder at the upper end thereof and movable therein to engage and apply pressure to the top of a column of liquid received in said cylinder, cable means connected at one end with said piston for moving the latter into engagement with the top of a column of liquid contained in said cylinder, said cable means including at its piston engaging end a normally open switch closeable upon contact of said piston with the top of a column of liquid contained in said cylinder and at its opposite end an actuating handle having a calibrated scale thereon for measuring the movement of said cable means away from a normal position, and a visual indicator circuit connected in series with the switch of said cable means for indicating contact of said piston with the top of a column of liquid contained in said cylinder.

3. An oil level indicator for automotive vehicle engines comprising a cylinder arranged to depend into the crank case and lubricating oil reservoir of the internal combustion engine of such a vehicle, a piston slidably mounted in the upper part of said cylinder, valve means in the lower part of said cylinder normally providing for the flow of oil from said reservoir into the cylinder to maintain a column of oil within the cylinder equal in height to the level of oil in the reservoir, said valve means being operable in response to pressure applied to the top of a column of oil within said cylinder to close communication between said cylinder and the reservoir, an operating member having a calibrated scale thereon movably carried by said vehicle within the reach and sight of one operating the vehicle, flexible connecting means uniting said operating member with said piston for moving said piston into contact with the top of a column of oil contained in said cylinder, said connecting means including a normally open switch closeable upon contact of said piston with the top of a column of oil contained in said cylinder, and an electrically energized signal having an operating circuit connected in series with the switch of said connecting means for indicating contact of said piston with the top of a column of oil in said cylinder.

BRUCE D. WOOLLEY.

REFERENCES CITED

The following references are of record in the file of this patent:

UNITED STATES PATENTS

| Number | Name | Date |
|---|---|---|
| 1,526,376 | Rosenmund | Feb. 17, 1925 |
| 1,526,377 | Rosenmund | Feb. 17, 1925 |
| 2,053,938 | Barker | Sept. 8, 1936 |
| 2,159,275 | Kinney | May 23, 1939 |